United States Patent
Choi et al.

(10) Patent No.: US 10,647,609 B2
(45) Date of Patent: May 12, 2020

(54) COATING COMPOSITION AND COOKING APPLIANCE

(71) Applicant: LG ELECTRONICS INC., Seoul (KR)

(72) Inventors: Wongyu Choi, Seoul (KR); Youngseok Kim, Seoul (KR); Suyeon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/211,402

(22) Filed: Dec. 6, 2018

(65) Prior Publication Data

US 2019/0169065 A1   Jun. 6, 2019

(30) Foreign Application Priority Data

Dec. 6, 2017  (KR) ........................ 10-2017-0166570

(51) Int. Cl.
   *C03C 8/08*     (2006.01)
   *C03C 8/14*     (2006.01)
   (Continued)

(52) U.S. Cl.
   CPC ............... *C03C 8/14* (2013.01); *C03C 3/066* (2013.01); *C03C 8/08* (2013.01); *F24C 15/005* (2013.01);
   (Continued)

(58) Field of Classification Search
   CPC ... C03C 8/08; C03C 8/14; C03C 3/066; F24C 15/005
   See application file for complete search history.

(56) References Cited

U.S. PATENT DOCUMENTS

| 5,886,329 A | 3/1999 | Kim |
| 8,410,404 B2 | 4/2013 | Baek et al. |

(Continued)

FOREIGN PATENT DOCUMENTS

| EP | 0 887 593 | 12/1998 |
| EP | 2 662 340 | 11/2013 |

(Continued)

OTHER PUBLICATIONS

European Search Report dated May 13, 2019.
Korean Office Action dated Mar. 9, 2020 issued in Application No. 10-2017-0166570.

*Primary Examiner* — Karl E Group
(74) *Attorney, Agent, or Firm* — Ked & Associates LLP (57) ABSTRACT

A coating composition may include a glass frit including Phosphorus Oxide ($P_2O_5$), Silicon Oxide ($SiO_2$), Boron Oxide ($B_2O_3$), a group I-based metal oxide, Barium Oxide (BaO), Sodium Fluoride (NaF), Titanium Oxide ($TiO_2$), Stannous Oxide (SnO), Zinc Oxide (ZnO), and an adhesion enhancement component. The $P_2O_5$ may be included by about 40 wt % to about 55 wt % based on a total weight of the glass frit. The $SiO_2$ may be included by about 5 wt % to about 15 wt % based on the total weight of the glass frit. The $B_2O_3$ may be included by about 5 wt % to about 10 wt % based on the total weight of the glass frit. The group I-based metal oxide may be included by about 3 wt % to about 10 wt % based on the total weight of the glass frit. The ZnO may be included by about 10 wt % to about 25 wt % based on the total weight of the glass frit, and the $TiO_2$ may be included by about 0.1 wt % to about 5 wt % based on the total weight of the glass frit.

19 Claims, 2 Drawing Sheets

(51) Int. Cl.
*F24C 15/00* (2006.01)
*F27D 1/00* (2006.01)
*C03C 3/066* (2006.01)
*F24C 15/02* (2006.01)
*C23D 7/00* (2006.01)
*C23D 1/00* (2006.01)

(52) U.S. Cl.
CPC ............ *F24C 15/02* (2013.01); *F27D 1/0003* (2013.01); *C03C 2204/02* (2013.01); *C03C 2205/02* (2013.01); *C03C 2205/04* (2013.01); *C03C 2207/02* (2013.01); *C03C 2207/04* (2013.01); *C23D 1/00* (2013.01); *C23D 7/00* (2013.01)

(56) References Cited

U.S. PATENT DOCUMENTS

| | | | |
|---|---|---|---|
| 9,072,400 B2 | 7/2015 | Benford, Jr. et al. | |
| 9,296,642 B2* | 3/2016 | Lee | F24C 15/08 |
| 9,296,643 B2* | 3/2016 | Kim | C03C 3/064 |
| 9,302,932 B2* | 4/2016 | Kim | C03C 3/21 |
| 10,427,973 B2* | 10/2019 | Gorecki | C23D 5/00 |
| 2011/0049122 A1 | 3/2011 | Baek et al. | |
| 2013/0299482 A1 | 11/2013 | Kim et al. | |
| 2018/0215655 A1* | 8/2018 | Kim | C03C 3/066 |

FOREIGN PATENT DOCUMENTS

| | | |
|---|---|---|
| EP | 3 357 876 | 8/2018 |
| KR | 10-2011-0023079 | 3/2011 |
| KR | 10-2014-0115562 | 10/2014 |
| KR | 10-2017-0054132 | 5/2017 |

* cited by examiner

COATING COMPOSITION AND COOKING APPLIANCE

CROSS-REFERENCE TO RELATED APPLICATION(S)

This application claims priority to Korean Patent Application No. 10-2017-0166570 filed on Dec. 6, 2017 in Korea, the entire contents of which is hereby incorporated by reference in its entirety.

BACKGROUND

1. Field

A coating composition and a cooking appliance are disclosed herein.

2. Background

Enamel is produced by coating vitreous glaze onto a surface of a metallic plate. In general, enamel is used for a cooking appliance, such as a microwave or an oven. The enamel may be classified into acid-resistant enamel which is able to prevent oxidation and heat-resistant enamel which is able to withstand a high temperature, depending on a type or use of the glaze. In addition, the enamel may be classified into aluminum enamel, zirconium enamel, titanium enamel, and soda glass enamel, depending on materials added to the enamel.

Regarding the enamel, after preparing an enamel material, that is, glass frit, the glass frit is pulverized through a dry-type process or a wet-type process, thereby forming a glass powder. Then, the glass powder is coated on a target to form an enamel layer. The enamel layer may be formed after the glass powder is coated and subject to a plastic process at a specific temperature.

The enamel layer is applied to an oven to realize a cleaning performance. However, various germs may be propagated at the enamel layer in a sealed space. In addition, in cooking, germs inside the oven may be infiltrate food.

Accordingly, a coating composition having a novel structure is required to inhibit such germs from infiltrating and propagated.

BRIEF DESCRIPTION OF THE DRAWINGS

Embodiments will be described in detail with reference to the following drawings in which like reference numerals refer to like elements, and wherein.

DETAILED DESCRIPTION

Hereinafter, a coating composition according to an embodiment and a cooking appliance including a coating composition will be described with reference to accompanying drawings. Wherever possible, like reference numerals have been used to indicate like elements and repetitive disclosure has been omitted.

Figure 1:
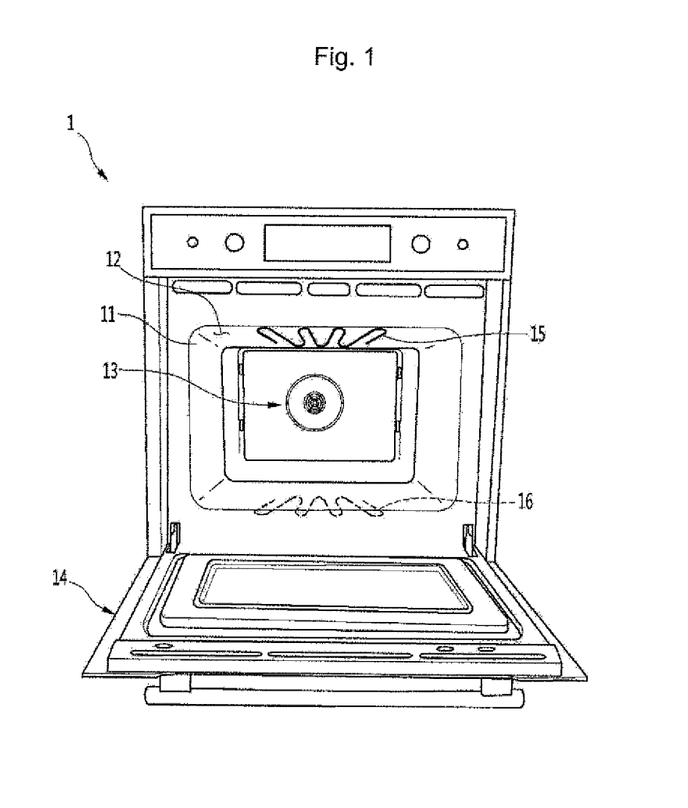
FIG. 1 is a front view illustrating a cooking appliance according to an embodiment.

FIG. 1 is a front view illustrating a cooking appliance according to an embodiment. Referring to FIG. 1, a cooking appliance 1 may include a cavity 11 to define a cooking chamber 12, a door 14 to selectively open/close the cooking chamber 12, and at least one heating source provided to heat an item to be cooked, such as food, in the cooking chamber 12.

The cavity 11 may be formed in a hexahedron shape having an open front face. The heating source may include a convection assembly 13 to discharge heated air into the cavity 11, an upper heater 15 disposed at an upper portion of the cavity 11, and a lower heater 16 disposed at a lower portion of the cavity 11. The heating source does not have to include all or each of the convection assembly 13, the upper heater 15, and the lower heater 16. That is, the heating source may include at least one of the convection assembly 13, the upper heater 15, or the lower heater 16. Further, the upper heater 15 and the lower heater 16 may be disposed inside or outside of the cavity 11.

Figure 2:
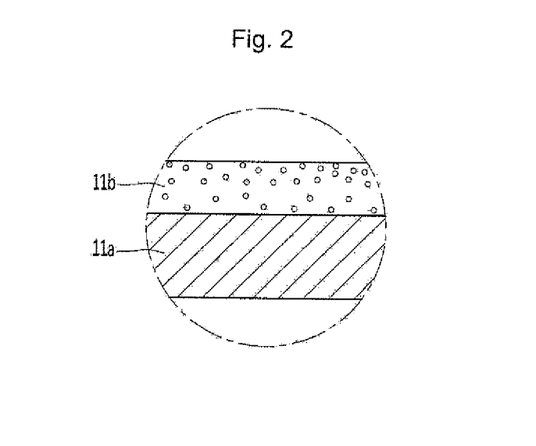
FIGS. 2 and 3 are partially enlarged views of an inner surface of a cavity of FIG. 1.
Figure 4:
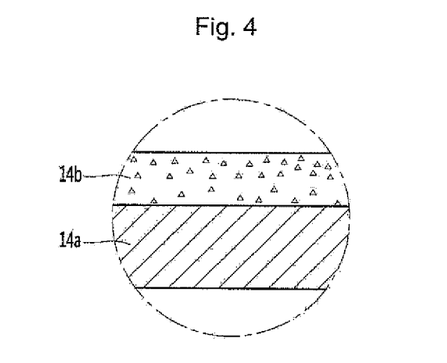
FIGS. 4 and 5 are partially enlarged views of an opposition surface of a door illustrated in FIG. 1.
Figure 5:
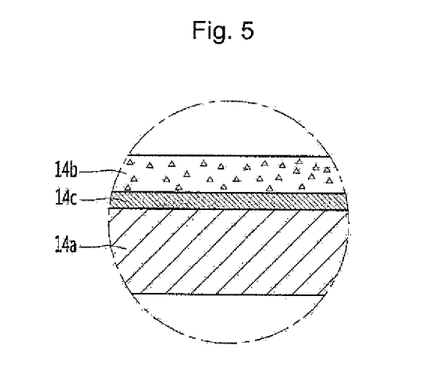

Referring to FIGS. 2 and 5, functional layers may be disposed on an inner surface of the cavity 11 and a back side of the door 14. The functional layer may include a coating composition described hereinafter. The functional layer may be formed by coating the inner surface of the cavity 11 and the back side of the door 14. That is, the functional layer may be a coating layer. The functional layer may, for example, improve heat resistance, chemical resistance, and stain resistance of the inner surface of the cavity 11 and the back side of the door 14.

Figure 3:
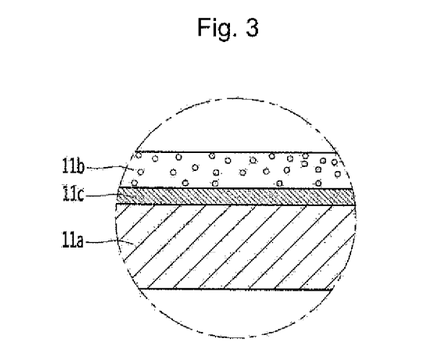

Referring to FIGS. 2 and 3, the functional layer may be disposed in the cavity 11. The cavity 11 may include a metallic layer 11a and a functional layer 11b on the metallic layer 11a. The metallic layer 11a may be a base material of the cavity 11. Referring to FIG. 2, the functional layer 11b may be disposed in direct contact with the metallic layer 11a.

Alternatively, referring to FIG. 3, the functional layer 11b may be disposed in indirect contact with the metallic layer 11a. A buffer layer 11c may be interposed between the metallic layer 11a and the functional layer 11b. The buffer layer 11c may include an adhesive layer. That is, an adhesive force between the metallic layer 11a and the functional layer 11b may be provided or improved by the buffer layer 11c.

Referring to FIGS. 4 and 5, the functional layer may be provided on the back side of the door 14. The functional layer may be provided on a back side of the door 14 facing the cooking chamber 12 in a state in which the cooking chamber 12 is closed by the door 14. The functional layer may, for example, improve heat resistance, chemical resistance, and stain resistance of the opposite surface of the door 14.

The cavity 14 may include a metallic layer 14a and a functional layer 14b on the metallic layer 14a. The metallic layer 14a may be a base material of the cavity 11. Referring to FIG. 4, the functional layer 14b may be disposed in direct contact with the metallic layer 14a.

Alternatively, referring to FIG. 5, the functional layer 14b may be provided in indirect contact with the metallic layer 14a. That is, a buffer layer 14c may be interposed between the metallic layer 14a and the functional layer 14b. The buffer layer 14c may include an adhesive layer. An adhesive force between the metallic layer 14a and the functional layer 14b may be provided or improved by the buffer layer 14c.

The functional layer 14b may be formed by coating the coating composition onto the inner surface of the cavity 11 and the back side of the door 14. The functional layer 14b may be formed by coating the inner surface of the cavity 12 and the back side of the door 14 to, for example, improve heat resistance, chemical resistance, and stain resistance of the inner surface of the cavity 11 and the back side or inner surface of the door 14.

Hereinafter, a coating composition according to embodiments coated on the cavity and the door of the cooking appliance will be described.

According to an embodiment, the coating composition may include glass frit including Phosphorus Pentoxide ($P_2O_5$), Silicon Dioxide ($SiO_2$), Boron Oxide ($B_2O_3$), a group I-based metal oxide, Barium Oxide (BaO), Sodium Fluoride (NaF), Titanium Oxide ($TiO_2$), Stannous Oxide (SnO), Zinc Oxide (ZnO), and an adhesion enhancement component. The $P_2O_5$ may be included by about 55 wt % or less based on a total weight of the glass frit. The $P_2O_5$ may be included by about 40 wt % to about 55 wt % based on the total weight of the glass frit.

The $P_2O_5$ may be included in the coating composition to improve a cleaning performance of the coating composition. When the $P_2O_5$ is included by less than about 40 wt % based on the total weight of the glass fit, the cleaning performance of the coating composition may be degraded. When the $P_2O_5$ is included by more than about 55 wt % based on the total weight of the glass frit, thermal characteristics of the coating composition may be degraded and vitrification of the coating composition may be deteriorated.

The $SiO_2$ may be included by about 15% or less based on the total weight of the glass frit. The $SiO_2$ may be included by about 5 wt % to about 15 wt % based on the total weight of the glass frit.

The $SiO_2$ may be included in the coating composition to form a glass structure of the coating composition, and to form a frame of the glass structure. In addition, the $SiO_2$ may improve acid-resistance of the coating composition.

When the $SiO_2$ is included by less than about 5 wt % based on the total weight of the glass frit, the glass structure of the coating composition becomes weakened, and thus, endurance of the functional layer may be degraded. When the $SiO_2$ is included by more than about 15 wt % based on the total weight of the glass frit, the cleaning performance of the coating composition may be degraded.

The $B_2O_3$ may be included by about 10 wt % or less based on a total weight of the glass frit. The $B_2O_3$ may be included by about 5 wt % to about 10 wt % based on the total weight of the glass frit.

The $B_2O_3$ may enlarge a vitrification region of the glass fit and may properly adjust a thermal expansion coefficient of the coating composition according to an embodiment. When the $B_2O_3$ is included by less than about 5 wt % based on the total weight of the glass fit, the vitrification region is reduced, and thus, the glass structure is weakened. Accordingly, endurance of the functional layer formed by the coating composition may be degraded. When the $B_2O_3$ is included by more than 10 wt % based on the total weight of the glass frit, the cleaning performance of the coating composition may be degraded.

The group I-based metal oxide may include at least one metallic oxide of Sodium Oxide ($Na_2O$) or Potassium Oxide ($K_2O$). The group I-based metal oxide may include $Na_2O$ and $K_2O$. That is, the glass frit may include both $Na_2O$ and $K_2O$.

The group I-based metal oxide may be included by about 10 wt % or less based on the total weight of the glass frit. The group I-based metal oxide may be included by about 3 wt % to about 10 wt % based on the total weight of the glass frit.

The group I-based metal oxide may be included in the coating composition to improve the cleaning performance of the coating composition. The group I-based metal oxide may improve the cleaning performance of the coating composition together with the $P_2O_5$.

When the group I-based metal oxide is included by less than 3 wt % based on the total weight of the glass frit, the cleaning performance of the coating composition may be degraded. When the group I-based metal oxide is included by more than about 10 wt % based on the total weight of the glass frit, the thermal characteristics of the coating composition may be degraded.

The $P_2O_5$, $Na_2O$, and $K_2O$ may form an alkali phosphate glass structure. In addition, the $P_2O_5$, $Na_2O$, and $K_2O$ may provide improved cleaning performance to the coating composition according to an embodiment. That is, as the glass frit may include $P_2O_5$, $Na_2O$, and $K_2O$, when the functional layer formed by the coating composition according to an embodiment is contaminated with food, the functional layer may be easily cleaned using water.

The BaO may be included by about 5 wt % or less based on the total weight of the glass frit. The BaO may be included by about 0.1 wt % to about 5 wt % based on the total weight of the glass frit. The BaO may be included in the coating composition to enhance the glass structure of the coating composition, and may continuously form the structure capable of maintaining the cleaning performance of the $P_2O_5$.

When BaO is included by about 0.1 wt % or less based on the total weight of the glass frit, the glass structure of the coating composition is weakened, thereby degrading the endurance and the cleaning performance of the functional layer formed by the coating composition. When BaO is included by more than about 0.1 wt % based on the total weight of the glass frit, a moisture absorption performance is increased by BaO, so it may be difficult to stably form glass.

The NaF may be included by about 2 wt % or less based on the total weight of the glass frit. The NaF may be included by about 0.1 wt % to about 2 wt % based on the total weight of the glass frit.

The NaF may appropriately adjust a surface tension of a coating film formed by the coating composition. The vitrification region of the glass frit may be enlarged by the NaF.

When NaF is included by less than about 0.1 wt % based on the total weight of the glass frit, the vitrification region of the glass fit is reduced, thereby weakening the glass structure. Accordingly, the endurance of the functional layer formed by the coating composition may be degraded. When the group I-based metal oxide is included by more than about 5 wt % based on the total weight of the glass frit, the cleaning performance of the coating composition may be degraded.

The SnO may be included by about 2 wt % or less based on the total weight of the glass frit. The SnO may be included by about 0.1 wt % to about 2 wt % based on the total weight of the glass frit. The SnO may appropriately adjust the surface tension of the coating film formed by the coating composition.

When SnO is included by less than about 0.1 wt % based on the total weight of the glass frit, the vitrification region of the glass frit is reduced, thereby weakening the glass structure. When the $TiO_2$ and the SnO are included by more than about 2 wt % based on the total weight of the glass frit, the cleaning performance of the coating composition may be degraded.

The $TiO_2$ may be included by about 5 wt % or less based on a total weight of the glass frit. The $TiO_2$ may be included by about 0.1 wt % to about 5 wt % based on the total weight of the glass frit.

The $TiO_2$ may improve a hiding power or opaqueness of the coating composition. That is, the hiding power or opaqueness may be improved by the $TiO_2$.

When the $TiO_2$ is included by about 0.1 wt % or less based on the total weight of the glass frit, the hiding power or opaqueness of the functional layer formed by the coating composition may be degraded, so that a color of the buffer layer is viewable from the outside when the $TiO_2$ is coated on the buffer layer. When the $TiO_2$ is included by more than about 5 wt % based on the total weight of the glass frit, the cleaning performance of the coating composition may be degraded.

The ZnO may be included by about 25 wt % or less based on the total weight of the glass frit. The ZnO may be included by about 5 wt % to about 25 wt % based on the total weight of the glass frit. The ZnO may be included by about 15 wt % to about 25 wt % based on the total weight of the glass frit.

The ZnO may be included in the coating composition to enhance the glass structure of the coating composition, and may continuously form the structure capable of maintaining the cleaning performance of the $P_2O_5$. In addition, the ZnO may be included in the coating composition, so that an antibacterial effect of the coating composition is improved.

The ZnO, which serves as an inorganic antibacterial agent, is not volatilized or decomposed, which provides excellent thermal stability. ZnO, which serves as a drug carrier or cosmetics, is not harmful to the human body. The ZnO has a lower price and is effective for gram positive bacteria and gram negative bacteria to represent a higher antimicrobial activity. Accordingly, ZnO has various advantages, so ZnO has been actively studied.

Although the antimicrobial mechanism of ZnO has not been clearly proved, it is generally known that the antimicrobial effect is produced due to the following three principles.

First, the antimicrobial effect of ZnO nanoparticles may be produced due to reactive oxygen species (ROS) or damage caused by the ROS. Electrons are trapped due to an oxygen vacancy present on a surface of the ZnO nanoparticles, and a oxidation-reduction reaction may be actively made in a position of the oxygen vacancy is present, thereby causing the ROS. The ROS causes oxidative stress to be increased, so sterilization may be induced.

Second, it is generally known that the antimicrobial effect of ZnO nanoparticles having solubility is produced due to emission of Zn ions. As Zn ions have an antibacterial effect against various strains, the Zn ions, which are produced by dissolution of the ZnO nanoparticles in an aqueous solution, may be a main cause of the antimicrobial mechanism of the ZnO nanoparticles.

Third, it is generally known that the antimicrobial mechanism of ZnO nanoparticles is made between the ZnO nanoparticles and germs. ZnO nanoparticles having positive (+) charges are attracted to cell walls of germs electrostatically having negative (−) charges and adsorbed on the cell walls. The ZnO nanoparticles adsorbed on the cell wall of germs can affect membrane fluidity and transport of membrane across the membrane, thereby causing the death of germs.

When ZnO is included by less than about 10 wt % based on the total weight of the glass frit, the antimicrobial effect of the glass structure of the coating composition may be degraded. In addition, the glass structure may be degraded, so the endurance and the cleaning performance of the functional layer formed by the coating composition may be degraded. When the ZnO is included by more than about 25 wt % based on the total weight of the glass frit, a moisture absorption performance may be increased by the ZnO, so it is difficult to stably form glass.

The $TiO_2$ and the ZnO may be included at specific weight ratio in the coating composition. The $TiO_2$ may be included with a weight smaller than a weight of the ZnO.

The weight of the $TiO_2$ may be at least 30% smaller than the weight of the ZnO. The weight of the $TiO_2$ may be about 10% to about 30% of the weight of the ZnO.

A weight ratio between the $TiO_2$ and the ZnO is associated with the endurance and the antimicrobial effect of the coating composition. When the weight of the $TiO_2$ is about 10% less than the weight of the ZnO, the antimicrobial effect may be maintained. However, if the weight of $TiO_2$ is reduced, the vitrification region is reduced. Accordingly, the endurance of the coating composition may be degraded. In addition, when the weight of the $TiO_2$ is about 30% more than the weight of the ZnO, the endurance of the coating composition may be maintained, but the antibacterial effect of the ZnO may be degraded.

The glass frit may further include at least one of Cobalt Oxide ($co_3O_4$), Nickel Oxide (NiO), Iron Oxide ($Fe_2O_3$) or Magnesium Dioxide ($MnO_2$). The glass frit may include $CO_3O_4$, NiO, $Fe_2O_3$, and $MnO_2$.

The $CO_3O_4$, NiO, $Fe_2O_3$, and $MnO_2$ may increase an adhesion force of the coating composition coated on the base material. That is, the $CO_3O_4$, NiO, $Fe_2O_3$, and $MnO_2$ may be adhesion enhancement components to enhance adhesion force when the coating composition is coated on the buffer layer on the base material. When the coating composition is disposed on the buffer layer of the base material using the $CO_3O_4$, NiO, $Fe_2O_3$, and $MnO_2$, the adhesion force between the buffer layer and the functional layer may be improved, thereby improving reliability.

The $CO_3O_4$, NiO, $Fe_2O_3$, and $MnO_2$ may be included by about 4 wt % or less based on the total weight of the glass frit. The $CO_3O_4$, NiO, $Fe_2O_3$, and $MnO_2$ may be included by about 0.1 wt % to about 4 wt % based on the total weight of the glass frit.

Hereinafter, embodiments will be described through a method for preparing a coating composition according to embodiments and comparative examples. The embodiments are provided only for illustrative and descriptive purposes. Accordingly, embodiments are not limited to the embodiments disclosed herein.

Evaluation of Characteristics

A glass frit material was provided as illustrated in Tables 1 and 2. Table 1 shows a composition of a ground coating layer serving as a buffer layer, and Table 2 shows a composition of a cover coating layer serving as the functional layer.

In this case, Ammonium Phosphate ($NH_4H_2PO_4$) was used as a source material of $P_2O_5$ and Sodium Carbonate ($Na_2CO_3$), Potassium Carbonate ($K_2CO_3$), and Barium Carbonate ($BaCo_3$) were used as source materials of $Na_2O$, $K_2O$, and BaO, respectively. The remaining components were the same as the components as illustrated in Table 1.

After mixing the glass frit material, the glass frit material was melted at a temperature of about 1400° C. for about one hour to about two hours. Then, the glass frit material was rapidly cooled on a quenching roller, thereby obtaining a glass cullet.

Thereafter, about 0.1 wt % to about 1 wt % of organopolysiloxane was put into the glass cullet, pulverized in a bawl mill through milling for about four hours to about six hours, and filtered out to have a particle diameter of about 45 μm or less, thereby forming the glass frit.

The ground coating layer serving as the buffer layer was sprayed on a low carbon steel sheet having an area of about 200×200 mm and a thickness of about 1 mm using a corona discharge gun. A voltage of the corona discharge gun was controlled to be in a range of about 40 kV to about 100 kV, and an amount of the glass frit sprayed on the low carbon steel sheet was about 300 g/m².

Thereafter, the glass frit was burnt for about 300 seconds to about 450 seconds under a temperature condition of about 830° C. to about 870° C., thereby forming the ground coating layer on one surface of the low carbon steel sheet. Next, the functional layer was formed on the ground coating layer through the process the same as the above process. Alternatively, a dry-type process and a wet-type process may be used.

The coating composition was mixed with the water at a ratio of about 1:1, clay, aluminum oxide, borax, and bentonite were added to the mixture, and the mixture was mixed for about 10 hours. Thereafter, the coating composition was sprayed on the low carbon steel sheet having the area of about 200×200 mm and the thickness of about 1 mm using the corona discharge gun. An amount of the coating composition sprayed on the low carbon steel sheet was about 300 g/m².

Thereafter, the low carbon steel sheet having the coating composition sprayed thereon was burnt under a temperature condition of about 840° C. to about 860° C. for about 180 seconds to about 360 seconds, thereby forming the ground coating layer on one surface of the low carbon steel sheet. Then, the functional layer was formed on the ground coating layer through the process the same as the above process.

Next, a characteristic evaluation of the functional layer prepared according to the embodiments and a comparative example were performed.

A softening point (Td) and coefficient of thermal expansion (CTE) of the functional layer were measured, and a cleaning performance of each functional layer was measured through a characteristic test of the cleaning performance. To measure thermal characteristics of the glass, a pellet-shaped sample was burnt under the same conditions as the burning conditions of the coating composition. After both surfaces of the sample were grounded in parallel to each other, the temperature was increased by about 10° C./minute through a thermo mechanical analyzer (TMA) to measure the softening point (Td) and the CTE.

In addition, according to the method for measuring the cleaning performance, about 1 g of chicken oil, which serves as a contaminant, was slightly applied on the sample surface, which is made by coating enamel on a test body having an area of about 200×200 mm, using a brush. Then, the test body having the contaminant was put into a constant-temperature oven and the contaminant was hardened at a temperature of about 250° C. for about one hour.

After the contaminant was hardened, the test body was naturally cooled and a hardening degree was checked. Next, the test body was dipped in a water vessel having water at a temperature of about 70° C. for about 10 minutes. The hardened chicken oil and a cherry pie filling, serving as an example for a sugar component, were wiped out with a force of about 3 kgf using a wet cloth. The contaminated enamel surface was uniformly wiped using a rod having a flat bottom surface with a diameter of about 5 cm. In this case, the number of times of reciprocally wiping was measured and defined as the number of times of cleaning the enamel as illustrated in Table 2. The evaluation indexes are shown in Tables 4 and 5.

Then, the characteristic evaluation of the functional layer prepared according to embodiments and the comparative example was performed. To measure the antibacterial effect of glass, a composition of the low carbon steel plate having an area of about 60×60 mm was burnt, and a test sample having the thickness of 150±50 μm was burnt under the burning condition of the enamel.

According to the manner to measure the antibacterial effect, after 400 μl of colon bacillus solution (1.0·108 cells/m) was dropped on an enamel sample surface having the size of about 60×60 mm, a sterile polyethylene film was covered on the enamel sample surface. Then, the enamel sample having the colon bacillus solution was neglected at a temperature of about 35° C. for about 24 hours, the film was removed, and then the result was dipped into 0.85% solution of 50 ml sterile NaCl. Then, 100 μl of colon bacillus solution was collected, colon bacillus was cultured at the temperature of 35° C. for about 24 hours, and then the number of remaining germs was counted (JIS Z 2801). The evaluation indexes are shown in Table 6.

TABLE 1

|  | Embodiment 1 (wt %) | Embodiment 2 (wt %) | Embodiment 3 (wt %) | Comparative example (wt %) |
|---|---|---|---|---|
| $P_2O_5$ | 54.3 | 54.3 | 57.2 | 30.7 |
| $Na_2O$ | 2.8 | 3.7 | 3.1 | 8.5 |
| $K_2O$ | 1.6 | 1.6 | 0.7 | 11.4 |
| BaO | 2.2 | 3.7 | 0.1 | 4.0 |
| ZnO | 23 | 20.1 | 18.3 | 14.1 |
| $SiO_2$ | 0.1 | 5.5 | 5.5 | 14.7 |
| $B_2O_3$ | 9.0 | 5.5 | 8.6 | 12.2 |
| SnO | 0.1 | 0.8 | 0.7 | 0.2 |
| $TiO_2$ | 3.4 | 1.2 | 3.7 | 1.0 |
| $Co_3O_4$ | 1.0 | 2.0 | 1.0 | 1.9 |
| $Fe_2O_3$ | 1.0 | 1.0 | 0.1 | 0.8 |
| NaF | 1.5 | 0.6 | 0.6 | 0.5 |

TABLE 2

| | Ground Coating layer (wt %) |
|---|---|
| $Na_2O$ | 15 |
| $K_2O$ | 10.7 |
| $Li_2O$ | 4.2 |
| $SiO_2$ | 48.8 |
| $B_2O_3$ | 10.1 |
| $TiO_2$ | 2.4 |
| $Co_3O_4$ | 1.0 |
| NiO | 0.5 |
| $Fe_2O_3$ | 0.8 |
| $MnO_2$ | 0.5 |
| NaF | 6.0 |

TABLE 3

| The number of times of reciprocating for cleaning up | Performance (level) |
|---|---|
| At least 5 times | 5 |
| At least 15 times | 4 |
| At least 25 times | 3 |
| At least 50 times | 2 |
| More than 50 times | 1 |

TABLE 4

|  | Embodiment 1 | Embodiment 2 | Embodiment 3 | Comparative example |
|---|---|---|---|---|
| Softening point (° C.) | 550.2 | 521.2 | 502 | 501.5 |
| Coefficient of thermal coefficient (×10$^{-7}$/° C.) | 91.2 | 95 | 88 | 89 |

TABLE 5

|  | Embodiment 1 | Embodiment 2 | Embodiment 3 | Comparative example |
|---|---|---|---|---|
| Cleaning performance | 5 | 5 | 5 | 5 |

TABLE 6

|  | The number of germs at the initial stage (cfu/ml$^{-1}$) | The number of germs after 24 hours (cfu/ml$^{-1}$) | Antimicrobial activity value | Antimicrobial activity conversion (%) |
|---|---|---|---|---|
| Sample | 1.0*10$^7$ | 5.06*10$^8$ | 0 | 0 |
| Embodiment 1 | 1.0*10$^7$ | 3.87*10$^4$ | 4.12 | 99.99 |
| Embodiment 2 | 1.0*10$^7$ | 3.97*10$^4$ | 4.16 | 99.99 |
| Embodiment 3 | 1.0*10$^7$ | 3.84*10$^4$ | 4.10 | 99.99 |
| Comparative example | 1.0*10$^7$ | 4.85*10$^8$ | 0.04 | 99.99 |

Referred to Table 4 and Table 5, it can be recognized that the functional layers prepared using glass frit have similar softening points and similar thermal expansion coefficients according to the embodiments and the comparative example. In addition, it can be recognized that the functional layers prepared using the glass fit according to embodiments and the comparative example have similar cleaning characteristics.

However, referring to Table 6, it can be recognized that the functional layer prepared using the glass frit according to the comparative example has antimicrobial characteristics much lower than that of the functional layer prepared using the glass frit according to embodiments. That is, the coating composition according to embodiments may have improved antimicrobial characteristic without influence exerted on the cleaning performance by adding ZnO having a specific composition ratio to the coating composition.

Embodiments provide a coating composition having improved cleaning performance and an antibacterial effect, and a cooking appliance employing the same. In one embodiment, a coating composition may include a glass frit including $P_2O_5$, $SiO_2$, $B_2O_3$, a group I-based metal oxide, BaO, NaF, $TiO_2$, SnO, ZnO, and an adhesion enhancement component. The $P_2O_5$ may be included by about 40 wt % to about 55 wt % based on a total weight of the glass fit. The $SiO_2$ may be included by about 5 wt % to about 15 wt % based on the total weight of the glass frit. The $B_2O_3$ may be included by about 5 wt % to about 10 wt % based on the total weight of the glass frit. The group I-based metal oxide may be included by about 3 wt % to about 10 wt % based on the total weight of the glass frit. The ZnO may be included by about 10 wt % to about 25 wt % based on the total weight of the glass frit, and the $TiO_2$ may be included by about 0.1 wt % to about 5 wt % based on the total weight of the glass frit.

As described above, the coating composition according to embodiments may have an improved cleaning performance and endurance. Accordingly, a cleaning performance of the cooking appliance may be improved. For example, the cooking appliance may be simply soaked in water to be easily cleaned. That is, even if a surface of the cooking appliance and a door surface facing a cooking chamber in a state in which the cooking chamber is shielded are contaminated with food and organic materials, which may occur during a cooking process, the surface of the cooking appliance and the door surface may be simply soaked in water to be easily cleaned.

Further, as the functional layer coated by the coating composition has excellent cleaning performance, an inner portion of the cooking appliance may be easily cleaned with less energy. Furthermore, the coating composition according to embodiments may have an improved antibacterial effect. That is, according to embodiments, the coating composition may have the improved antibacterial effect without influencing cleaning performance and endurance. Accordingly, multiplication of germs generated or propagated in the cooking appliance may be prevented.

In addition, according to embodiments, as the coating composition has a softening point and a coefficient of thermal expansion coefficient at a specific temperature or more, the coating composition may endure cooking at a higher temperature and cleaning for a long time.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A coating composition, comprising:
   a glass frit including Phosphorus Pentoxide ($P_2O_5$), Silicon Dioxide ($SiO_2$), Boron Oxide ($B_2O_3$), a group I-based metal oxide, Barium Oxide (BaO), Sodium Fluoride (NaF), Titanium Oxide (TiO2), Stannous Oxide (SnO), Zinc Oxide (ZnO), and an adhesion enhancement component, wherein the $P_2O_5$ is included by about 40 wt % to about 55 wt % based on a total weight of the glass frit, wherein the $SiO_2$ is included by about 5 wt % to about 15 wt % based on the total weight of the glass frit, wherein the $B_2O_3$ is included by about 5 wt % to about 10 wt % based on the total weight of the glass frit, wherein the group I-based metal oxide is included by about 3 wt % to about 10 wt % based on the total weight of the glass frit, wherein the ZnO is included by about 10 wt % to about 25 wt % based on the total weight of the glass frit, and wherein the $TiO_2$ is included by about 0.1 wt % to about 5 wt % based on the total weight of the glass fit.

2. The coating composition of claim 1, wherein the BaO is included by about 0.1 wt % to about 5 wt % based on the total weight of the glass frit, wherein the NaF is included by about 0.1 wt % to about 2 wt % based on the total weight of the glass fit, and wherein the SnO is included by about 0.1 wt % to about 2 wt % based on the total weight of the glass frit.

3. The coating composition of claim 1, wherein the $TiO_2$ is included by about 10% to about 30% based on a weight of the ZnO.

4. The coating composition of claim 1, wherein the group I-based metal oxide includes Sodium Oxide ($Na_2O$) and Potassium Oxide ($K_2O$).

5. The coating composition of claim 1, wherein the adhesion enhancement component includes a metal oxide having at least one selected from the group of Cobalt Oxide ($Co_3O_4$), Nickel Oxide (NiO), Iron Oxide ($Fe_2O_3$) and Manganese Dioxide ($MnO_2$), and wherein the adhesion enhancement component is included by about 0.1 wt % to about 4 wt % based on the total weight of the glass frit.

6. A cooking appliance, comprising:
   a cavity having a cooking chamber;
   a door to selectively open/close the cooking chamber; and
   at least one heating source that provides heat for heating an object to be cooked in the cooking chamber, wherein at least one of the cavity or the door includes:
     a metallic base material; and
     a functional layer on the metallic base material, wherein the functional layer includes Phosphorus Pentoxide ($P_2O_5$), Silicon Dioxide ($SiO_2$), Boron Oxide ($B_2O_3$), a group I-based metal oxide, Barium Oxide (BaO), Sodium Fluoride (NaF), Titanium Oxide ($TiO_2$), Stannous Oxide (SnO), Zinc Oxide (ZnO), and an adhesion enhancement component, wherein the $P_2O_5$ is included by about 40 wt % to about 55 wt % based on a total weight of the glass frit, wherein the $SiO_2$ is included by about 5 wt % to about 15 wt % based on the total weight of the glass frit, wherein the $B_2O_3$ is included by about 5 wt % to about 10 wt % based on the total weight of the glass frit, wherein the group I-based metal oxide is included by about 3 wt % to about 10 wt % based on the total weight of the glass frit, wherein the ZnO is included by about 10 wt % to about 25 wt % based on the total weight of the glass frit, and wherein the $TiO_2$ is included by about 0.1 wt % to about 5 wt % based on the total weight of the glass frit.

7. The cooking appliance of claim 6, further comprising:
   a buffer layer interposed between the metallic base material and the functional layer.

8. The cooking appliance of claim 7, wherein the buffer layer comprises an adhesive layer.

9. The cooking appliance of claim 6, wherein the BaO is included by about 0.1 wt % to about 5 wt % based on the total weight of the glass frit, wherein the NaF is included by about 0.1 wt % to about 2 wt % based on the total weight of the glass frit, and wherein the SnO is included by about 0.1 wt % to about 2 wt % based on the total weight of the glass frit.

10. The cooking appliance of claim 6, wherein the $TiO_2$ is included by about 10% to about 30% based on a weight of the ZnO.

11. The cooking appliance of claim 6, wherein the group I-based metal oxide includes Sodium Oxide ($Na_2O$) and Potassium Oxide ($K_2O$).

12. The cooking appliance of claim 6, wherein the adhesion enhancement component includes a metal oxide having at least one selected from the group of Cobalt Oxide ($Co_3O_4$), Nickel Oxide (NiO), Iron Oxide ($Fe_2O_3$) and Manganese Dioxide ($MnO_2$), and wherein the adhesion enhancement component is included by about 0.1 wt % to about 4 wt % based on the total weight of the glass frit.

13. A cooking appliance, comprising:
 a cavity having a cooking chamber;
 a door to selectively open/close the cooking chamber; and
 at least one heating source that provides heat for heating an object to be cooked in the cooking chamber, wherein at least one of the cavity or the door is coated with a coating composition comprising Phosphorus Pentoxide ($P_2O_5$), Silicon Dioxide ($SiO_2$), Boron Oxide ($B_2O_3$), a group I-based metal oxide, Barium Oxide (BaO), Sodium Fluoride (NaF), Titanium Oxide ($TiO_2$), Stannous Oxide (SnO), Zinc Oxide (ZnO), and an adhesion enhancement component, wherein the $P_2O_5$ is included by about 40 wt % to about 55 wt % based on a total weight of the glass frit, wherein the $SiO_2$ is included by about 5 wt % to about 15 wt % based on the total weight of the glass frit, wherein the $B_2O_3$ is included by about 5 wt % to about 10 wt % based on the total weight of the glass frit, wherein the group I-based metal oxide is included by about 3 wt % to about 10 wt % based on the total weight of the glass frit, wherein the ZnO is included by about 10 wt % to about 25 wt % based on the total weight of the glass frit, and wherein the $TiO_2$ is included by about 0.1 wt % to about 5 wt % based on the total weight of the glass frit.

14. The cooking appliance of claim 13, wherein the coating composition comprises:
 a metallic base material;
 a functional layer on the metallic base material; and
 a buffer layer interposed between the metallic base material and the functional layer, wherein the functional layer includes the $P_2O_5$, the $SiO_2$, the $B_2O_3$, the group I-based metal oxide, the BaO, the NaF, the $TiO_2$, the SnO, the ZnO, and the adhesion enhancement component.

15. The cooking appliance of claim 14, wherein the buffer layer comprises an adhesive layer.

16. The cooking appliance of claim 13, wherein the BaO is included by about 0.1 wt % to about 5 wt % based on the total weight of the glass frit, wherein the NaF is included by about 0.1 wt % to about 2 wt % based on the total weight of the glass frit, and wherein the SnO is included by about 0.1 wt % to about 2 wt % based on the total weight of the glass frit.

17. The cooking appliance of claim 13, wherein the $TiO_2$ is included by about 10% to about 30% based on a weight of the ZnO.

18. The cooking appliance of claim 13, wherein the group I-based metal oxide includes Sodium Oxide ($Na_2O$) and Potassium Oxide ($K_2O$).

19. The cooking appliance of claim 13, wherein the adhesion enhancement component includes a metal oxide having at least one selected from the group of Cobalt Oxide ($Co_3O_4$), Nickel Oxide (NiO), Iron Oxide ($Fe_2O_3$) and Manganese Dioxide ($MnO_2$), and wherein the adhesion enhancement component is included by about 0.1 wt % to about 4 wt % based on the total weight of the glass frit.

* * * * *